(12) United States Patent
Longin

(10) Patent No.: US 10,814,699 B2
(45) Date of Patent: Oct. 27, 2020

(54) STEERING WHEEL AND MOTOR VEHICLE

(71) Applicant: FORD GLOBAL TECHNOLOGIES, LLC, Dearborn, MI (US)

(72) Inventor: David Longin, Herent (BE)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 16/222,455

(22) Filed: Dec. 17, 2018

(65) Prior Publication Data

US 2019/0202262 A1    Jul. 4, 2019

(30) Foreign Application Priority Data

Jan. 2, 2018   (DE) .................. 10 2018 200 009

(51) Int. Cl.
| | |
|---|---|
| *B60H 1/24* | (2006.01) |
| *B62D 1/06* | (2006.01) |
| *B60H 1/34* | (2006.01) |
| *B62D 1/187* | (2006.01) |
| *B62D 1/08* | (2006.01) |

(52) U.S. Cl.
CPC ............ *B60H 1/242* (2013.01); *B60H 1/3407* (2013.01); *B62D 1/06* (2013.01); *B62D 1/065* (2013.01); *B62D 1/08* (2013.01); *B62D 1/187* (2013.01)

(58) Field of Classification Search
CPC ............... B60H 1/242; B60H 1/3407; B60H 2001/003; B60H 1/00292; B60H 1/34; B62D 1/065; B62D 1/06; B62D 1/08; B62D 1/187
See application file for complete search history.

(56) References Cited

U.S. PATENT DOCUMENTS

| | | | | |
|---|---|---|---|---|
| 2,251,370 A | * | 8/1941 | Motzer .............. | B60H 1/00292 237/12.3 R |
| 3,144,785 A | * | 8/1964 | Steiner .................. | B62D 1/187 74/493 |
| 3,149,501 A | * | 9/1964 | Keir ....................... | B62D 1/065 74/552 |

(Continued)

FOREIGN PATENT DOCUMENTS

| | | |
|---|---|---|
| DE | 102015219486 B3 | 10/2016 |
| JP | 3595325 B1 | 12/2004 |

OTHER PUBLICATIONS

English Machine Translation of DE102015219486B3 dated Oct. 13, 2016.

(Continued)

*Primary Examiner* — Drew J Brown
(74) *Attorney, Agent, or Firm* — David Coppiellie; King & Schickli, PLLC

(57) ABSTRACT

A steering wheel for a motor vehicle is provided, wherein the steering wheel includes a steering-wheel rim, a steering-wheel center, at least one steering-wheel spoke connecting the steering-wheel rim and the steering-wheel center, and an air duct. The air duct is designed to duct an air flow, generated by a ventilation system of the motor vehicle. The air duct comprises at least one air outlet, which is designed in such a way that in the fitted state of the steering wheel the air flow emerging from the air outlet meets a windshield of the motor vehicle. A motor vehicle having the steering wheel is furthermore provided.

10 Claims, 2 Drawing Sheets

(56) References Cited

U.S. PATENT DOCUMENTS

| | | | | |
|---|---|---|---|---|
| 6,007,420 A | * | 12/1999 | Harm | B60H 1/00292 |
| | | | | 454/140 |
| 6,382,712 B1 | | 5/2002 | Bruss | |
| 6,481,312 B1 | * | 11/2002 | Wissel | B62D 1/065 |
| | | | | 74/552 |
| 6,533,184 B1 | * | 3/2003 | Kim | B60H 1/00292 |
| | | | | 237/12.3 R |
| 9,399,480 B2 | * | 7/2016 | Zhang | B62D 1/065 |
| 2006/0121843 A1 | | 6/2006 | Koval | |
| 2015/0158370 A1 | * | 6/2015 | Glaser | B60H 1/00292 |
| | | | | 454/69 |
| 2016/0214456 A1 | | 7/2016 | Maranville et al. | |
| 2019/0344820 A1 | * | 11/2019 | Pine | B62D 1/065 |

OTHER PUBLICATIONS

English Machine Translation of JP3595325B1.
"Steering Wheel Heating"; Gentherm; http://www.gentherm.com/en/page/steering-wheel-heating?language =en; Copyright 2017; pp. 1-2.

* cited by examiner

STEERING WHEEL AND MOTOR VEHICLE

TECHNICAL FIELD

This document relates to a steering wheel designed for a motor vehicle, having a steering-wheel rim, a steering-wheel center, at least one steering-wheel spoke connecting the steering-wheel rim and the steering-wheel center, and an air duct, which is designed to duct an air flow generated by a ventilation system of the motor vehicle. This document furthermore relates to a motor vehicle having this steering wheel.

BACKGROUND

DE 102015219486 B3 discloses a steering wheel for a motor vehicle, having a steering-wheel rim, at least one steering-wheel spoke, a ventilation system having at least one air delivery device and at least a first and a second air duct formed in the steering-wheel rim. In the operation of the air delivery device the first air duct is designed as an intake duct, via which air present outside the steering wheel is sucked into the latter, and the second air duct as a discharge duct, via which air is conveyed from inside the steering wheel to the outside of the steering wheel.

US 20060121843 A1 shows a steering wheel arrangement for a motor vehicle. The steering wheel arrangement comprises a steering column extending from a vehicle body to a steering wheel, an air passage formed along at least a part of an outer surface of the steering column, and at least one air outlet having a fluid-ducting connection to the air passage. The air passage is designed to carry air from a vehicle ventilation system. The air outlet is positioned on the steering wheel in order to discharge air from the vehicle ventilation system.

SUMMARY

The object of this document is to provide a steering wheel and a motor vehicle which allow improved ventilation.

This object is achieved by a steering wheel and by a motor vehicle as claimed in the following claims.

The steering wheel is designed for a motor vehicle. The steering wheel comprises a steering-wheel rim, a steering-wheel center, at least one steering-wheel spoke connecting the steering-wheel rim and the steering-wheel center, and an air duct, which is designed to duct an air flow generated by a ventilation system of the motor vehicle. The air duct comprises at least one air outlet, which is formed in such a way that in the fitted state of the steering wheel the air flow emerging from the air outlet meets a windshield of the motor vehicle.

This advantageously affords an improved ventilation of the windshield, since the windshield, in particular the part of the windshield situated in front of the driver, can be subjected to the air flow from the steering wheel. Influences exerted on the windshield by the driver, such as breath, perspiration or the wearing of damp clothing, can be compensated for and misting of the windshield prevented.

In an advantageous embodiment of the steering wheel, the air outlet is arranged in the steering-wheel rim, in particular in a twelve o'clock position.

The air outlet is thereby positioned at the highest point of the steering wheel and therefore as close as possible to the windshield. The air flow thereby has to cover the shortest possible distance from the steering wheel to the windshield and can exert a maximum effect.

Alternatively or in addition to the arrangement of the air outlet in the steering-wheel rim, at least the one air outlet may be arranged in a steering-wheel spoke and/or in the steering-wheel center.

This provides an alternative, particularly for steering wheels having an interrupted steering-wheel rim in the upper area, for example in the form of a racing sports steering wheel or a control yoke.

In a further advantageous embodiment of the steering wheel, the latter is designed in such a way that the air flow meets a field of vision of a driver.

This allows the air flow to act in the area of the windshield most relevant for driving safety. Safety is thereby increased.

In a further advantageous embodiment of the steering wheel, the air duct leads through a steering-wheel spoke from the steering-wheel center to the steering-wheel rim.

This gives the steering wheel a pleasing appearance. The air duct is not visible to the driver.

In a further advantageous embodiment of the steering wheel, the air duct is formed along the entire circumference of the steering wheel rim.

This allows the entire steering-wheel rim to be supplied with heat from the air flow flowing through the air duct.

In a further advantageous embodiment of the steering wheel, the air duct in the steering-wheel rim is at least partially formed or surrounded, at least in some areas, by a thermal conduction element which conducts heat energy from the air flow flowing through the air duct to an outer face of the steering wheel.

This makes it possible to vary the heat output along the air duct and thus, in particular, to rapidly warm the points of the steering wheel which are in contact with the driver's hands.

In a further advantageous embodiment of the steering wheel, the air outlet comprises at least one adjustable air baffle element.

This allows an adjustment of the direction and/or the strength of the air flow. The air flow can be better targeted.

The steering wheel in all its embodiments is preferably integrated into a motor vehicle. The motor vehicle comprises a windshield and a ventilation system for generating an air flow. The steering wheel has a fluid-ducting connection to the ventilation system. The steering wheel is arranged in such a way that the air flow from the air outlet of the steering wheel, generated by means of the ventilation system, meets the windshield.

The motor vehicle thereby comprises the steering wheel which allows an improved ventilation of the windshield.

In a further advantageous embodiment of the motor vehicle, this comprises a steering column, which is designed in such a way that the steering wheel is height-adjustable.

This allows the position of the steering wheel to be adjusted to suit the size and/or sitting position of the driver. At the same time the position of the air outlet is also varied.

BRIEF DESCRIPTION OF THE DRAWING FIGURES

Further advantages of the steering wheel and motor vehicle can be seen from the detailed description and the figures. The steering wheel and motor vehicle are explained in more detail referring to the figures and the following description.

DETAILED DESCRIPTION

Figure 1:
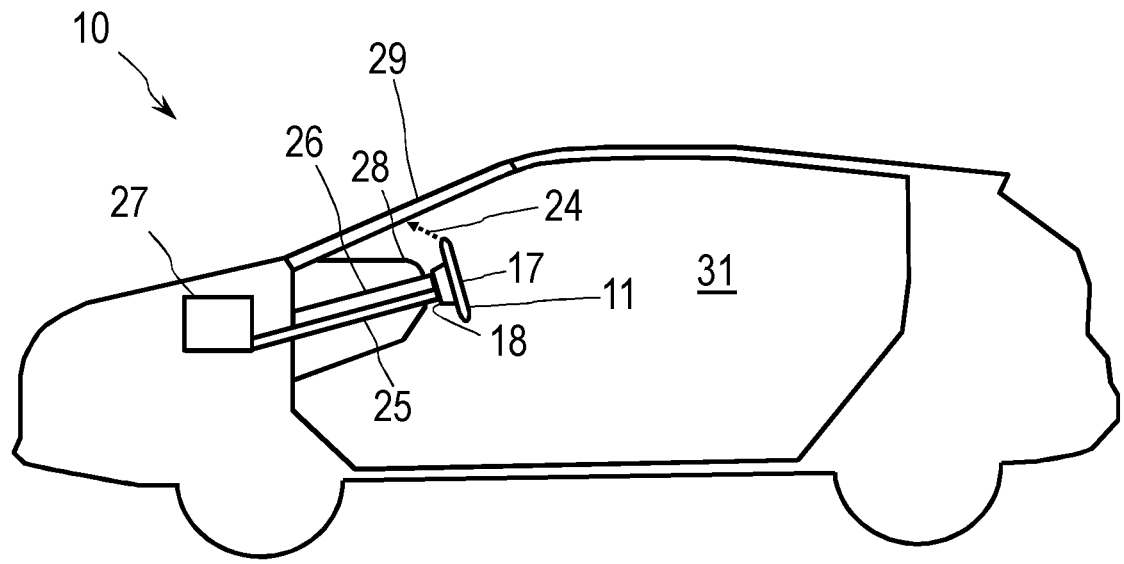
FIG. 1 shows an exemplary embodiment of the new and improved motor vehicle.
Figure 2:
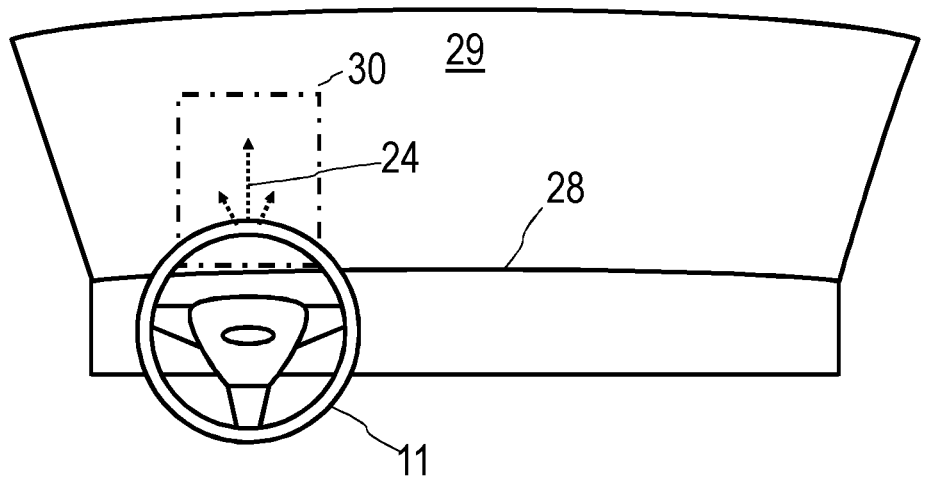
FIG. 2 shows a detailed view of the motor vehicle of FIG. 1.

In FIG. 1 an exemplary embodiment of the new and improved motor vehicle 10 is represented schematically in longitudinal section. FIG. 2 in a schematic cross-sectional representation shows an example of a position of the fitted steering wheel 11 in a straight-ahead position. The motor vehicle comprises a windshield 29. The motor vehicle 10 furthermore comprises the steering wheel 11, which is, in particular, fitted to a steering column 26. The steering column 26 is, in particular, designed in such a way that the steering wheel 11 is height-adjustable and/or adjustable in a longitudinal direction.

The steering wheel 11 is arranged, as is usual, in the vehicle interior 31 of the motor vehicle 10 and hence behind the windshield 29, in particular behind a dashboard support 28. A front side 17 of the steering wheel 11 is arranged facing rearwards into the vehicle interior 31 and a rear side 18 of the steering wheel 11 is arranged facing forwards towards the dashboard support 28.

The motor vehicle 10 furthermore comprises a ventilation system 27. The ventilation system 27 is designed to generate an air flow 24, particularly in such a way that the air flow has a higher temperature than a temperature of the vehicle interior 31. For this purpose, the ventilation system 27 preferably comprises a heating device. The ventilation system 27 may furthermore comprise a dehumidifier. The ventilation system 27 is, in particular therefore, a climate control system.

The ventilation system 27 has a fluid-ducting connection to the steering wheel 11, in particular by means of a feed duct 25. This feed duct 25 may be arranged, at least in portions, next to the steering column 26, for example, in particular parallel to the steering column 26. The air flow 24 generated by the ventilation system 27 can be ducted through the feed duct 25 to the steering wheel 11, in particular to the rear side 18 of the steering wheel 11.

Figure 3:
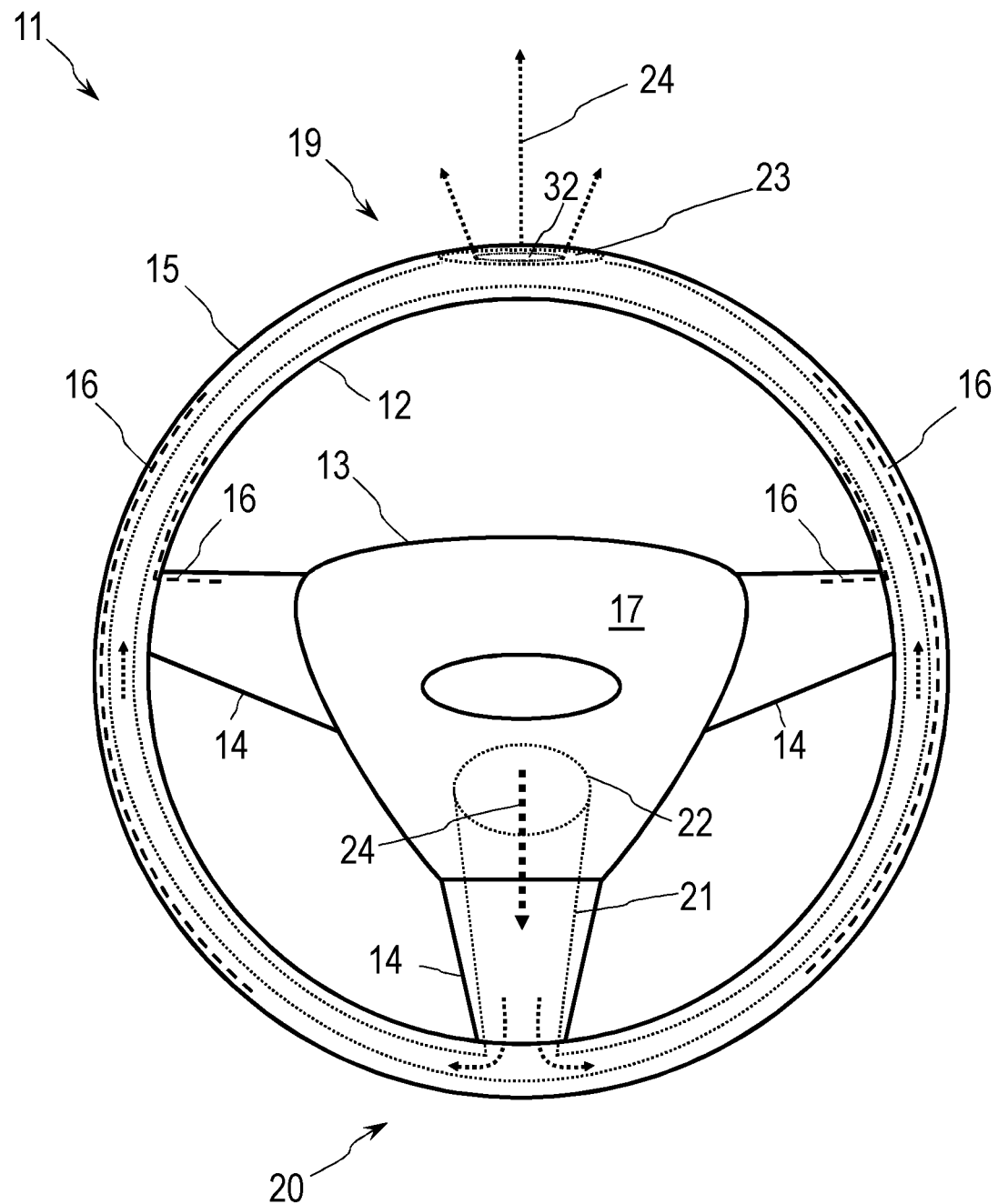
FIG. 3 shows an exemplary embodiment of a new and improved steering wheel.

The steering wheel 11 is represented schematically in a detailed view in FIG. 3. The steering wheel 11 comprises a steering-wheel rim 12, a steering-wheel center 13 and at least one steering-wheel spoke 14. The steering-wheel center 13, as is usual, is arranged centrally in the steering wheel 11. The steering-wheel rim 12 is situated at a distance from the steering-wheel center 13, running around the steering-wheel center 13, in particular in a closed annular shape. The steering-wheel rim 12 comprises a rim outer face 15. This is the circumferential face of the steering-wheel rim 12 and the face which the driver touches with at least one hand when steering. At least the one steering-wheel spoke 14 extends substantially radially from the steering-wheel center 13 to the steering-wheel rim 12. At least the one steering-wheel spoke 14 may also be of a multiple-arm design. In particular, the steering wheel 11 comprises multiple steering-wheel spokes 14, in particular three, wherein one of the three steering-wheel spokes 14 is connected to the steering-wheel rim 12 in a lower area 20 of the steering-wheel rim 12, in particular in a six o'clock position. The other two of the three steering-wheel spokes 14 in this example each extend to one side of the steering-wheel rim 12.

The steering wheel 11 comprises an air duct 21, which is designed to duct an air flow 24. In the illustrated embodiment, the air duct 21 is provided with at least one air outlet 23, which is designed in such a way that the air flow 24 emerging from the air outlet 23 meets the windshield 29 when the steering wheel 11 is fitted at its intended location in the motor vehicle 10, particularly when the steering wheel 11 is situated substantially in the straight-ahead position.

At least the one air outlet 23 is preferably arranged in the steering-wheel rim 12, preferably in an upper area 19, in particular in a twelve o'clock position. It is depicted in this way in the figures.

It is also possible for at least the one air outlet 23 to be arranged in the steering-wheel spoke 14, or in one of the steering-wheel spokes 14, or in the steering-wheel center 13. Furthermore, it is feasible for the air duct 21 to comprise multiple air outlets 23, which are arranged in the various parts of the steering wheel 11, that is to say in the steering-wheel rim 12 and/or in the steering-wheel center 13 and/or in the steering-wheel spoke 14.

The air outlet 23 may be formed from multiple apertures. The air outlet 23 may furthermore comprise at least one air baffle element 32, which is in particular adjustable so that the air flow 24 can be directed in different directions and/or so that the air flow 24 can be regulated.

The air outlet 23 is, in particular, designed in such a way that the air flow 24 meets an area of the windshield 29 which forms a field of vision 30 of the driver (see FIG. 2). The field of vision 30 is the area of the windshield 29 through which the driver of the motor vehicle 10 must look most frequently whilst driving the motor vehicle 10. The field of vision 30 is a 30 cm wide area of the windshield 29 positioned horizontally and centrally in relation to the steering wheel 11.

For receiving the air flow 24, the air duct 21 of the steering wheel 11 in particular comprises an air inlet 22, which is arranged on the rear side 18 in the steering-wheel center 13. The air inlet 22 is designed to be capable of fluid-ducting connection to the feed duct 25. The air inlet 22 has a fluid-ducting connection to the feed duct 25, particularly in the straight-ahead position of the steering wheel 11.

Except at the air inlet 22 and at least the one air outlet 23, the air duct 21 is arranged inside the steering wheel 11. The air duct extends from the air inlet 22 through the steering-wheel center 13 to at least one steering-wheel spoke 14, through at least the one steering-wheel spoke 14 to the steering-wheel rim 12 and through at least one part of the steering-wheel rim 12 to the air outlet 23. The air duct 21 therefore comprises a spoke air duct as the part leading through the steering-wheel spoke 14 and a rim air duct as the part leading through the steering-wheel rim, wherein the spoke air duct opens into the rim air duct. In particular, the rim air duct extends along the entire steering-wheel rim 12. For this purpose, the air duct 21 is preferably arranged in a single steering-wheel spoke 14, which is arranged opposite the air outlet 22, that is to say in particular in the six o'clock position. The spoke air duct here opens into the rim air duct in the six o'clock position. The rim air duct is, in particular, designed as a ring, or in two runs with one run leading round to the right and the other run around to the left; both runs leading in particular to the air outlet 23.

The steering wheel in particular comprises at least one thermal conduction element 16, which is designed to conduct heat energy from the air flow 24 flowing through the air duct 21 to an outer face of the steering wheel 11. The outer face is preferably the rim outer face 15. The outer face may furthermore comprise an outer face of one of the steering-wheel spokes 14, in particular a thumb rest of the steering-wheel spoke 14. The thermal conduction element 16 here is either itself part of the air duct 21, or at least partially surrounds the air duct 21.

Although the steering wheel and motor vehicle have been more fully illustrated and described in detail through the preferred exemplary embodiments, they are not limited by the examples disclosed and other variants may be inferred by the person skilled in the art without departing from the scope of this document.

The figures are not necessarily true in every detail or true to scale and may be represented in enlarged or reduced form in order to afford a better overview. For this reason, the functional details disclosed here are not to be interpreted restrictively but merely as a basic illustration which affords the person skilled in this field of the art guidance in how to implement the steering wheel and the motor vehicle in a variety of ways.

The expression "and/or" employed here, when used in a series of two or more elements, means that each of the elements cited may be used singly or in any combination of two or more of the elements listed. For example, if an assemblage containing the components A, B and/or C is described, the assemblage may contain A alone; B alone; C alone; A and B in combination; A and C in combination; B and C in combination; or A, B, and C in combination.

What is claimed:

1. A steering wheel for a motor vehicle comprising: a steering-wheel rim, a steering-wheel center, at least one steering-wheel spoke connecting the steering-wheel rim and the steering-wheel center, and an air duct, said air duct being adapted to duct an air flow, generated by a ventilation system of the motor vehicle, characterized in that said air duct includes at least one adjustable air baffle element, configured to direct the air flow emerging from the at least one adjustable air baffle outlet toward a windshield of the motor vehicle.

2. The steering wheel as claimed in claim 1, wherein the at least one adjustable air baffle outlet is arranged in the steering-wheel rim.

3. The steering wheel as claimed in claim 2, wherein the at least one adjustable air baffle outlet is arranged in a twelve o'clock position.

4. The steering wheel as claimed in claim 1, wherein the steering wheel directs the air flow upon a field of vision of a driver.

5. The steering wheel as claimed in claim 4, wherein the air duct leads through said at least one steering-wheel spoke from the steering-wheel center to the steering-wheel rim.

6. The steering wheel as claimed in claim 5, wherein the air duct is formed along an entire circumference of the steering-wheel rim.

7. The steering wheel as claimed in claim 6, wherein the steering-wheel rim includes a thermal conduction element, which conducts heat energy from the air flow flowing through the air duct to an outer face of the steering wheel.

8. The steering wheel as claimed in claim 1, wherein the steering-wheel rim includes a thermal conduction element, that conducts heat energy from the air flow flowing through the air duct to an outer face of the steering wheel.

9. A motor vehicle comprising:
a windshield, a ventilation system for generating an air flow and a steering wheel wherein the steering wheel includes a fluid-ducting connection to the ventilation system, and the steering wheel is arranged in such a way that the air flow from at least one adjustable air baffle outlet of the steering wheel, generated by means of the ventilation system, meets the windshield.

10. The motor vehicle as claimed in claim 9, wherein the motor vehicle comprises a steering column adapted for adjusting a height of said steering wheel.

* * * * *